(12) United States Patent
Huh et al.

(10) Patent No.: US 11,165,155 B2
(45) Date of Patent: Nov. 2, 2021

(54) FILM ANTENNA AND DISPLAY DEVICE INCLUDING THE SAME

(71) Applicants: DONGWOO FINE-CHEM CO., LTD., Jeollabuk-do (KR); POSTECH RESEARCH AND BUSINESS DEVELOPMENT FOUNDATION, Gyeongsangbuk-do (KR)

(72) Inventors: Yoon Ho Huh, Seoul (KR); Jong Min Kim, Gyeonggi-do (KR); Han Sub Ryu, Gyeongsangbuk-do (KR); Won Bin Hong, Seoul (KR)

(73) Assignees: DONGWOO FINE-CHEM CO., LTD., Jeollabuk-Do (KR); POSTECH RESEARCH AND BUSINESS DEVELOPMENT FOUNDATION, Gyeongsangbuk-Do (KR)

(*) Notice: Subject to any disclaimer, the term of this patent is extended or adjusted under 35 U.S.C. 154(b) by 46 days.

(21) Appl. No.: 16/798,807

(22) Filed: Feb. 24, 2020

(65) Prior Publication Data

US 2020/0194896 A1 Jun. 18, 2020

Related U.S. Application Data

(63) Continuation of application No. PCT/KR2018/009692, filed on Aug. 23, 2018.

(30) Foreign Application Priority Data

Aug. 24, 2017 (KR) .................. 10-2017-0107145

(51) Int. Cl.
*H01Q 1/48* (2006.01)
*H01Q 9/04* (2006.01)
*H01Q 1/38* (2006.01)

(52) U.S. Cl.
CPC .............. *H01Q 9/0407* (2013.01); *H01Q 1/38* (2013.01); *H01Q 1/48* (2013.01)

(58) Field of Classification Search
CPC ........ B32B 27/00; B32B 7/12; H01Q 1/2291; H01Q 1/243; H01Q 1/38; H01Q 1/44; H01Q 1/48; H01Q 21/065; H01Q 9/0407
See application file for complete search history.

(56) References Cited

U.S. PATENT DOCUMENTS

2004/0246690 A1* 12/2004 Nakamura ........ H01L 23/49822
361/763
2008/0315768 A1* 12/2008 Yamakita ................. H01J 11/24
313/586
(Continued)

FOREIGN PATENT DOCUMENTS

CN 102610911 A 7/2012
CN 102610922 A 7/2012
(Continued)

OTHER PUBLICATIONS

International Search Report for PCT/KR2018/009692 dated Dec. 4, 2018.
(Continued)

*Primary Examiner* — Thien M Le
(74) *Attorney, Agent, or Firm* — The PL Law Group, PLLC (57) ABSTRACT

A film antenna according to an embodiment of the present invention includes a first electrode layer, a dielectric layer having a thickness in a range from 50 μm to 1,000 μm and having a dielectric constant in a range from 2 to 10 on the first electrode layer, and a second electrode layer on the dielectric layer. The dielectric constant and the thickness of the dielectric layer are controlled to improve high-frequency driving property of the film antenna.

16 Claims, 6 Drawing Sheets

(56) References Cited

U.S. PATENT DOCUMENTS

| | | | | |
|---|---|---|---|---|
| 2014/0090451 A1* | 4/2014 | Surman | ............... | G01F 23/244 |
| | | | | 73/61.43 |
| 2017/0207120 A1* | 7/2017 | Boyanov | ........... | H01L 21/76849 |
| 2017/0324142 A1* | 11/2017 | Talty | .................... | H01Q 1/1271 |
| 2019/0277798 A1* | 9/2019 | Martins | ..................... | G01T 1/24 |
| 2020/0335874 A1* | 10/2020 | Mizusaki | ............. | G02F 1/1339 |

FOREIGN PATENT DOCUMENTS

| | | |
|---|---|---|
| CN | 105591185 A | 5/2016 |
| CN | 106104915 A | 11/2016 |
| CN | 106876969 A | 6/2017 |
| JP | H11-122023 A | 4/1999 |
| KR | 10-2003-0013739 A | 2/2003 |
| KR | 10-2003-0095557 A | 12/2003 |
| KR | 10-2009-0065229 A | 6/2009 |
| KR | 10-2009-0066899 A | 6/2009 |
| KR | 10-2009-081256 A | 7/2009 |
| KR | 10-2009-9088030 A | 8/2009 |
| KR | 10-2010-0003035 A | 1/2010 |
| KR | 10-1371862 B1 | 3/2014 |
| KR | 10-2015-0071495 A | 6/2015 |

OTHER PUBLICATIONS

Office action dated Apr. 13, 2020 from Korean Patent Office in a counterpart Korean Patent Application No. 10-2017-0107145 (all the cited references are listed in this IDS.) (English translation is also submitted herewith.).

Office action dated Jul. 14, 2021 from China Patent Office in a counterpart China Patent Application No. 201880054104.7 (all the cited references are listed in this IDS.) (English translation is also submitted herewith.).

* cited by examiner

FILM ANTENNA AND DISPLAY DEVICE INCLUDING THE SAME

CROSS REFERENCE TO RELATED APPLICATIONS AND CLAIM OF PRIORITY

The present application is a continuation application to International Application No. PCT/KR2018/009692 with an International Filing Date of Aug. 23, 2018, which claims the benefit of Korean Patent Application No. 10-2017-0107145 filed on Aug. 24, 2017 at the Korean Intellectual Property Office, the disclosures of which are incorporated by reference herein in their entirety.

BACKGROUND

1. Field

The present invention relates to a film antenna and a display device including the same. More particularly, the present invention relates to a film antenna including an electrode and a dielectric layer, and a display device including the same.

2. Description of the Related Art

As information technologies have been developed, a wireless communication technology such as Wi-Fi, Bluetooth, etc., is combined with a display device in, e.g., a smartphone form. In this case, an antenna may be combined with the display device to provide a communication function.

As mobile communication technologies have been rapidly developed, an antenna capable of operating an ultra-high frequency communication is needed in the display device. Further, as thin-layered display devices with high transparency and resolution such as a transparent display device, a flexible display device, etc., have been developed recently, the antenna having improved transparent and flexible properties is also required.

For example, when a transparent conductive oxide electrode such as an ITO electrode is used for applying an antenna structure in the display device, a transmittance may be improved, but a signal loss may be caused due to a resistance increase. When a dielectric constant of a dielectric layer is controlled for a high-frequency band signal reception, a thickness of an area for inserting the antenna structure may be excessively increased. Further, the thickness of the dielectric layer may not be easily controlled independently from an antenna electrode and/or the display device.

Additionally, as the display device becomes lighter and thinner, a thickness and a volume of the antenna structure are also reduced to cause deterioration of an electrode sensitivity and resistance.

Therefore, development of an antenna having low resistance and high sensitivity while not degrading display quality of the display device is needed.

SUMMARY

According to an aspect of the present invention, there is provided a film antenna having improved electrical and optical properties and being operable in a high-frequency band.

According to an aspect of the present invention, there is provided a display device including a film antenna having improved electrical and optical properties and being operable in a high-frequency band.

The above aspects of the present invention may be achieved by one or more of the following features or constructions:

(1) A film antenna including: a first electrode layer; a dielectric layer on the first electrode layer, the dielectric layer having a thickness in a range from 50 μm to 1000 μm and having a dielectric constant in a range from 2 to 10; and a second electrode layer on the dielectric layer.

(2) The film antenna according to the above (1), wherein the first electrode layer includes a ground layer.

(3) The film antenna according to the above (1), wherein the dielectric layer has a multi-layered structure.

(4) The film antenna according to the above (3), wherein the dielectric layer includes an adhesive layer and a substrate layer sequentially stacked from the first electrode layer.

(5) The film antenna according to the above (4), wherein the substrate layer includes at least one from the group consisting of glass, cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC) and polymethylmethacrylate (PMMA).

(6) The film antenna according to the above (4), wherein the adhesive layer includes an optical clean adhesive (OCA) material or a pressure sensitive adhesive (PSA) material.

(7) The film antenna according to the above (1), wherein the second electrode layer includes a mesh-pattern structure.

(8) The film antenna according to the above (7), wherein the second electrode layer further includes a dummy mesh layer.

(9) The film antenna according to the above (1), wherein the second electrode layer includes an antenna array electrode, a transmission line and a pad electrode.

(10) The film antenna according to the above (9), wherein the antenna array electrode and the pad electrode are disposed at different layers or at different levels.

(11) The film antenna according to the above (10), further including a via structure electrically connecting the antenna array electrode and the pad electrode to each other.

(12) The film antenna according to the above (10), further including a connecting ground layer electrically connecting the pad electrode and the first electrode layer to each other.

(13) The film antenna according to the above (12), wherein the connecting ground layer surrounds one sidewall of the dielectric layer to be connected to sidewalls of the pad electrode and the first electrode layer.

(14) The film antenna according to the above (1), wherein a driving frequency of the film antenna is in a range from 25 GHz to 35 GHz.

(15) A display device including the film antenna according to any one of the above (1) to (14).

(16) The display device according to claim 15, including a display panel that includes a panel substrate, a pixel structure, a wiring structure and an electrode structure, wherein the wiring structure or the electrode structure of the display panel serves as the first electrode layer of the film antenna.

A film antenna according to exemplary embodiments of the present invention may include a dielectric layer interposed between a first electrode layer and a second electrode layer. A thickness and a dielectric constant of the dielectric layer may be controlled in a predetermined range independently from the first electrode layer and/or the second electrode layer so that an antenna structure operable in a desired high-frequency band may be obtained.

In exemplary embodiments, the first electrode layer may serve as a ground layer, and the dielectric layer may have a multi-layered structure including a substrate layer and an adhesive layer. Each thickness of the substrate layer and the adhesive layer may be controlled to achieve a dielectric constant for the desired high-frequency band.

In exemplary embodiments, the second electrode layer may include an antenna array electrode and a pad electrode, and a thickness, a shape, a material and/or a transmittance of the electrodes may be controlled to be optimized in a corresponding region of a display device to which the film antenna is applied.

DETAILED DESCRIPTION OF THE EMBODIMENTS

According to exemplary embodiments of the present invention, there is a provided a film antenna which includes a first electrode layer, a dielectric layer on the first electrode layer and a second electrode layer on the dielectric layer. The dielectric layer may have a thickness for implementing high-frequency signal sensing and reception within a predetermined range of a dielectric constant.

The film antenna may be, e.g., a microstrip patch antenna fabricated as a transparent film. The film antenna may be applied to, e.g., a communication device for high frequency or ultrahigh frequency (e.g., 3G, 4G, 5G or more) mobile communications. For example, the film antenna may be operated in a high frequency band of about 10 GHz or more, in an embodiment, from about 25 GHz to about 35 GHz.

According to exemplary embodiments of the present invention, a display device including the film antenna is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
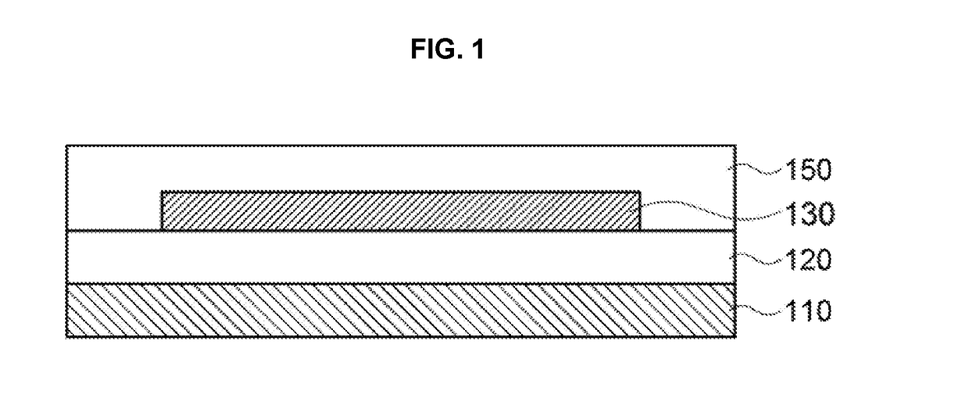
FIG. 1 is a schematic cross-sectional view illustrating a film antenna in accordance with exemplary embodiments.

FIG. 1 is a schematic cross-sectional view illustrating a film antenna in accordance with exemplary embodiments.

Referring to FIG. 1, the film antenna may include a first electrode layer 110, a dielectric layer 120, a second electrode layer 130 and a passivation layer 150.

In exemplary embodiments, the first electrode layer 110 may serve as a ground layer of the film antenna. For example, the first electrode layer 110 may include a conductive material such as a metal, an alloy or a transparent metal oxide.

In some embodiments, various conductive members of a communication device and a display device to which the film antenna is applied may be used as the first electrode layer 110. For example, the display device may be a liquid crystal display (LCD) device or an organic electroluminescent display (OLED) device, and the conductive members including a gate electrode, a data line, a scan line, a driving line, etc., of the display device may be utilized as the first electrode layer 110.

The dielectric layer 120 may include an insulation material having a predetermined dielectric constant. The dielectric layer 120 may include, e.g., an inorganic insulation material such as silicon oxide, a metal oxide, etc., or a ceramic dielectric material. The dielectric layer 120 may include an organic insulation material such as an acrylic resin, an epoxy resin, an imide-based resin, etc.

A capacitance or an inductance may be generated between the first electrode layer 110 and the second electrode layer 130 by the dielectric layer 120 so that a frequency band for driving or sensing by the film antenna may be adjusted.

In exemplary embodiments, the dielectric constant of the dielectric layer 120 may be adjusted in a range of about 2 to about 10. If the dielectric constant is less than about 2, the driving frequency may be excessively increased and an antenna performance in a desired band may not be realized. If the dielectric constant exceeds about 10, the driving frequency may be excessively reduced and antenna driving in a desired high frequency band (for example, 5G band) may not be implemented.

In exemplary embodiments, a thickness of the dielectric layer 120 may be adjusted in a range of about 50 µm to about 1000 µm. If the thickness of the dielectric layer 120 is less than about 50 µm, high frequency driving of the film antenna may not be substantially implemented. If the thickness of the dielectric layer 120 exceeds about 1000 µm, a signal transmission coefficient may be excessively reduced to degrade a performance of a transmission line.

The second electrode layer 130 may include a signal electrode, an antenna array electrode and/or a radiation electrode of the film antenna. In some embodiments, the second electrode layer 130 includes silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo) or calcium (Ca) or an alloy thereof. These may be used alone or in a combination thereof. For example, the second electrode layer 130 may include silver (Ag) or a silver alloy for implementing low resistance. For example, the second electrode layer 130 may include a silver-palladium-copper (APC) alloy.

In an embodiment, the second electrode layer 130 mat include copper (Cu) or a copper alloy in consideration of low resistance and pattern formation with a fine line width. For example, the second electrode layer 130 may include a copper-calcium (Cu—Ca) alloy.

In some embodiments, the second electrode layer 130 may include a transparent metal oxide such as indium tin oxide (ITO), indium zinc oxide (IZO), indium zinc oxide (ITZO), zinc oxide (ZnOx), etc.

In some embodiments, the second electrode layer 130 may include a mesh-pattern structure to improve a transmittance.

In some embodiments, the first electrode layer 110 may include a transparent metal oxide such as ITO to improve the transmittance when the film antenna is mounted in the display device. The second electrode layer 130 may include a low resistance metal or an alloy such as silver (Ag) or a silver alloy for obtaining low resistance and high frequency driving. In an embodiment, the second electrode layer 130 may not include a transparent metal oxide such as ITO.

For example, the second electrode layer 130 may have a multi-layered structure including at least one metal or alloy layer and a transparent metal oxide layer.

The passivation layer 150 may be formed on the dielectric layer 120 to cover the second electrode layer 130. The passivation layer 150 may substantially serve as a protective layer of the film antenna. The passivation layer 150 may include an inorganic insulating material and/or an organic insulating material as described above.

Figure 2:
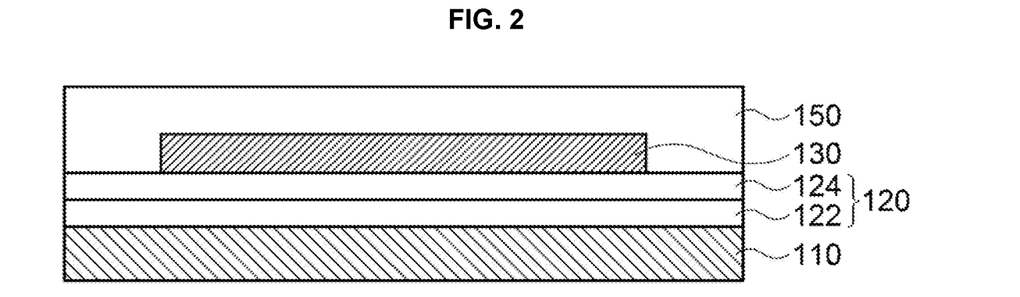
FIG. 2 is a schematic cross-sectional view illustrating a film antenna in accordance with some exemplary embodiments.

FIG. 2 is a schematic cross-sectional view illustrating a film antenna in accordance with some example embodiments. Referring to FIG. 2, a dielectric layer 120 of the film antenna may have a multi-layered structure of at least two layers.

In some embodiments, the dielectric layer 120 may include an adhesive layer 122 and a substrate layer 124.

The adhesive layer 122 may be disposed on the first electrode layer 110. The adhesive layer 122 may be formed of, e.g., an optical clean adhesive (OCA) or a pressure sensitive adhesive (PSA) material including a resin such as an acryl-based resin, a silicon-based resin, an epoxy-based resin, a urethane-based resin, etc.

The substrate layer 124 may serve as a substrate or a support layer for forming the second electrode layer 130. The substrate layer 124 may include, e.g., glass, cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), polymethylmethacrylate (PMMA), or the like. These may be used alone or in a combination thereof.

In exemplary embodiments, a total thickness and a dielectric constant of the dielectric layer 120 including the adhesive layer 122 and the substrate layer 124 may be adjusted to the above-described range. A sum of the thicknesses of the adhesive layer 122 and the base layer 124 may range from about 50 μm to about 1,000 μm, and the dielectric constant of the dielectric layer 120 including the adhesive layer 122 and the base layer 124 may be from about 2 to about 10.

In some embodiments, the second electrode layer 130 may be formed on the substrate layer 124, and then the substrate layer 124 and the first electrode layer 110 may be combined with each other by the adhesive layer 122. In this case, the thickness and the dielectric constant of the dielectric layer 120 as described above may be obtained by adjusting the thickness of the adhesive layer 122. Additionally, even when the conductive member of the display device is used as the first electrode layer 110, the thickness and the dielectric constant of the dielectric layer 120 may be adjusted by the adhesive layer 122 independently from the second electrode layer 130 and/or the first electrode layer 110.

Figure 3:
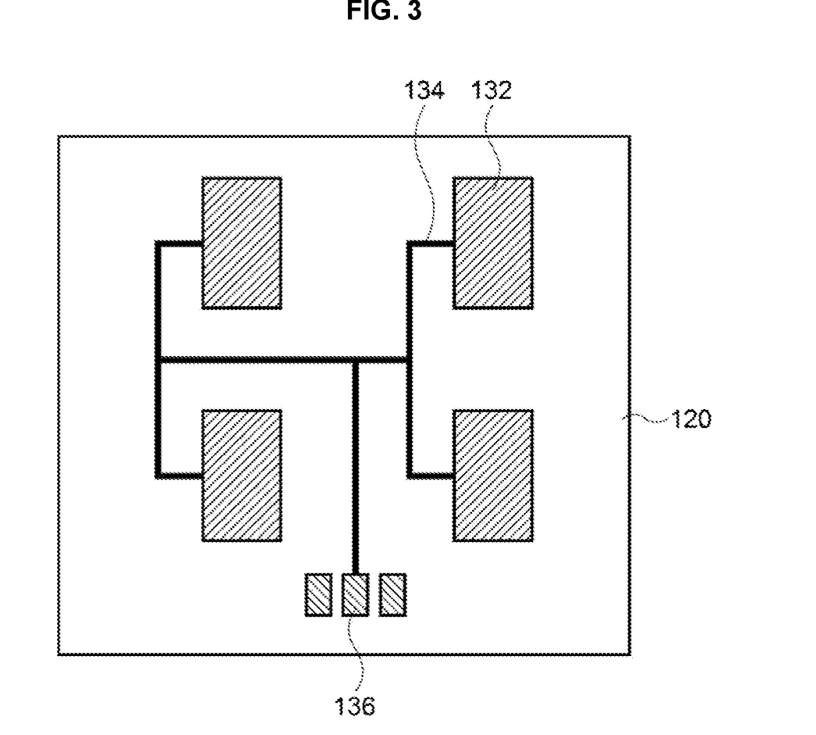
FIGS. 3 and 4 are a schematic top planar view and a cross-sectional view, respectively, illustrating a film antenna in accordance with some exemplary embodiments.
Figure 4:
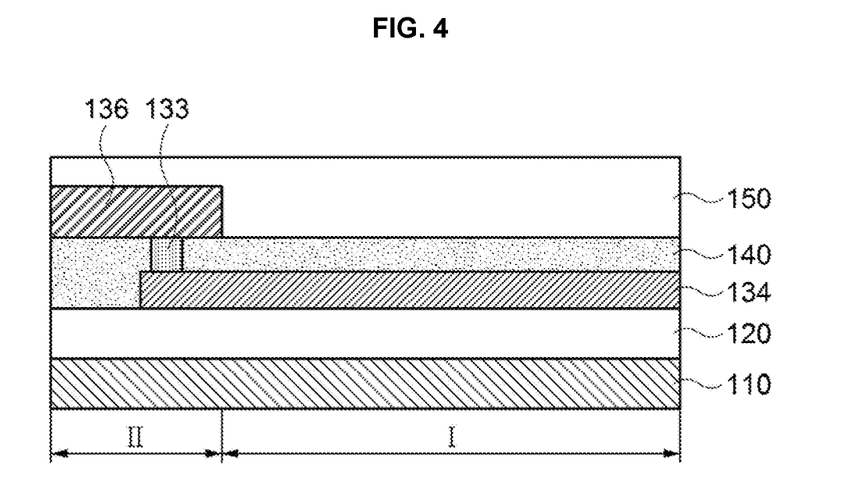

FIGS. 3 and 4 are a top planar view and a cross-sectional view, respectively, illustrating a film antenna in accordance with some example embodiments. The same reference numerals are used to indicate elements substantially the same as those described with reference to FIG. 1, and detailed descriptions on the elements will be omitted herein.

Referring to FIGS. 3 and 4, the film antenna may include a first region I and a second region II. In exemplary embodiments, when the film antenna is applied to a display device, the first region I may correspond to a display region of the display device, and the second region II may correspond to a peripheral region of the display device (e.g., a light shielding portion or a bezel portion).

In some embodiments, the second electrode layer 130 as described with reference to FIG. 1 may include an antenna array electrode 132, a transmission line 134, and a pad electrode 136.

The antenna array electrode 132 may serve as, e.g., a radiation electrode of the film antenna. The antenna array electrode 132 may be electrically connected to the transmission line 134 and may be disposed on a portion of the dielectric layer 120 in the first region I. In an embodiment, the antenna array electrode 132 may extend partially on the second region II.

In some embodiments, an insulation layer 140 may be formed on the dielectric layer 120 to cover the antenna array electrode 132. The insulation layer 140 may be formed commonly on the first region I and the second region II. The insulation layer 140 may include the above-described inorganic insulation material and/or organic insulation material.

The pad electrode 136 may be disposed on an upper surface of the insulation layer 140. For example, the pad electrode 136 may serve as a driving electrode of the film antenna.

In exemplary embodiments, the pad electrode 136 may be disposed selectively on the second region II. In an embodiment, an end portion of the pad electrode 136 may partially extend on the first region (I).

As illustrated in FIG. 4, the pad electrode 136 and the antenna array electrode 132 may be disposed at different layers or at different levels by the insulation layer 140. In this case, the pad electrode 136 and the antenna array electrode 132 may be electrically connected to each other by a via structure 133. For example, an end portion of the transmission line 134 and the pad electrode 136 may be electrically connected to each other by the via structure 133.

In exemplary embodiments, a contact hole may be formed in the insulation layer 140 to partially expose a top surface of the transmission line 134. Subsequently, the via structure 133 may be formed by forming a metal layer or an alloy layer filling the contact hole and then patterning the metal layer or the alloy layer. In some embodiments, the via structure 133 and pad electrode 136 may be formed as a substantially single member integrally connected to each other. In this case, the via structure 133 and the pad electrode 136 may be formed by the same patterning process for the metal or alloy film.

The passivation layer 150 may be formed on the insulation layer 140 to cover the pad electrode 136.

The antenna array electrode 132 may be disposed on the first region I, and thus the antenna array electrode 132 may be formed to have a higher transmittance than that of the pad electrode 136 to prevent visibility in the display region. In some embodiments, the antenna array electrode 132 may have a smaller thickness than that of the pad electrode 136 or may have a mesh-pattern structure to increase transmittance.

In some embodiments, the antenna array electrode 132, transmission line 134 and the pad electrode 136 may be formed at the same layer or at the same level. For example, the antenna array electrode 132, the transmission line 134, and the pad electrode 136 may be disposed on the dielectric layer 120 to be electrically connected via the transmission line 134. In this case, the via structure 133 may be omitted.

Figure 5:
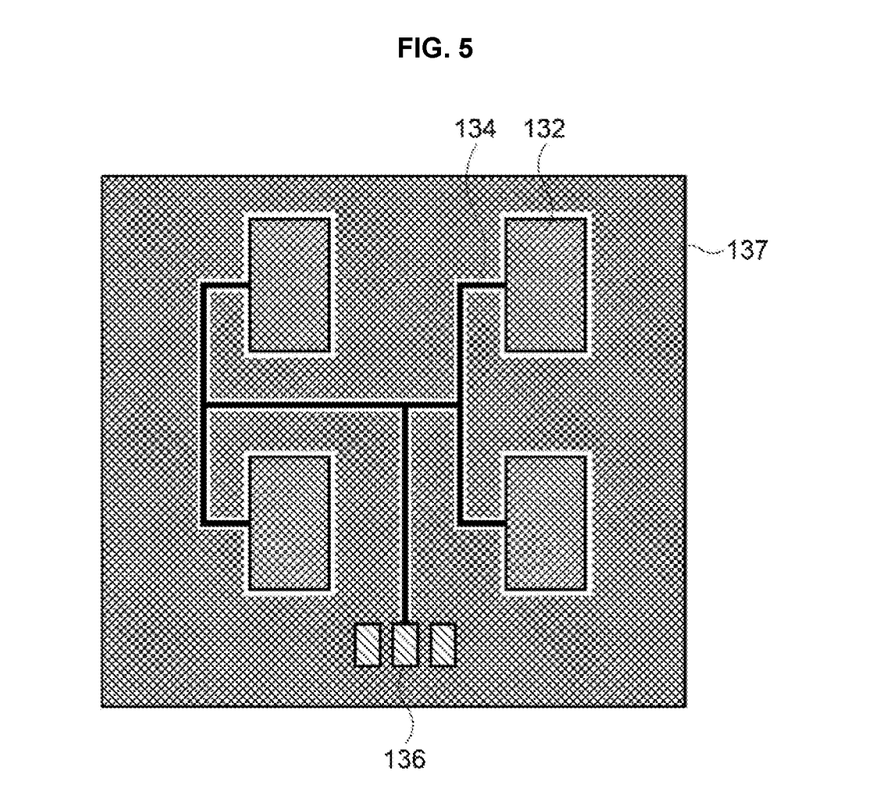
FIG. 5 is a schematic top planar view illustrating a film antenna in accordance with some exemplary embodiments.

FIG. 5 is a top planar view illustrating a film antenna in accordance with some example embodiments.

Referring to FIG. 5, if the second electrode layer 130 (e.g., the antenna array electrode 132) of the film antenna includes a mesh pattern structure, a dummy mesh layer 137 may be formed around the antenna array electrode 132. In exemplary embodiments, the dummy mesh layer 137 may be formed on the dielectric layer 120 and may be physically and electrically separated from the antenna array electrode 132 and the transmission line 134.

The dummy mesh layer 137 may include a mesh pattern substantially the same as or similar to that of the antenna array electrode 132. As the dummy mesh layer 137 is included, a pattern shape variation of each region may be averaged or reduced to prevent the first electrode 132 from being recognized by, e.g., the user of the display device.

In exemplary embodiments, the dummy mesh layer 137 may be formed commonly on the first region I and the second region II illustrated in FIG. 4, and may be patterned to be separated and spaced apart from the antenna array electrode 132 and the transmission line 134.

Figure 6:
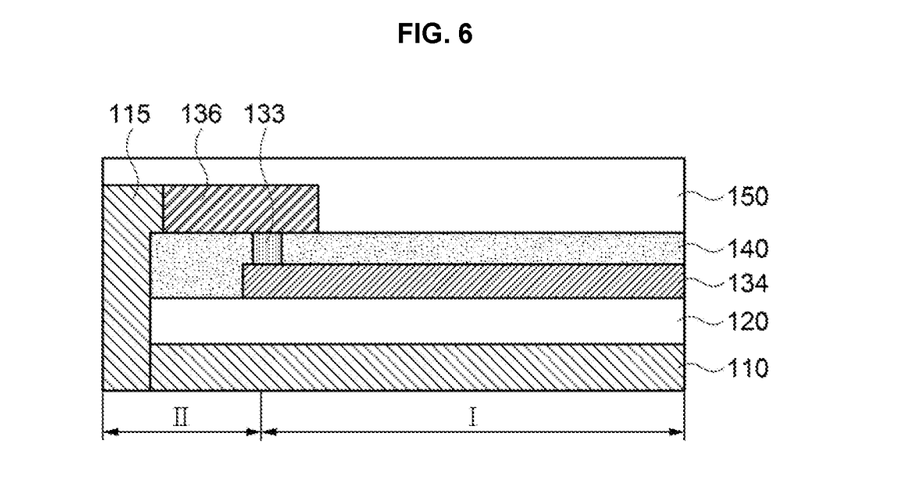
FIG. 6 is a schematic cross-sectional view illustrating a film antenna in accordance with some exemplary embodiments.

FIG. 6 is a schematic cross-sectional view illustrating a film antenna in accordance with some exemplary embodiments.

Referring to FIG. 6, a connecting ground layer 115 may electrically connect the second electrode layer 130 and the first electrode layer 110 to each other. In exemplary embodiments, the connecting ground layer 115 may electrically connect the pad electrode 136 and the first electrode layer 110 to each other.

The connecting ground layer 115 may surround one sidewall of the dielectric layer 120 to be connected to the pad electrode 136 and the first electrode layer 110. In some embodiments, the connecting ground layer 115 may extend to also surround one sidewall of the insulation layer 140.

The connecting ground layer 115 may be in contact with or connected to sidewalls of the pad electrode 136 and the first electrode layer 110. A ground may be formed through upper, lateral and lower portions of the film antenna by the connecting ground layer 115.

In some embodiments, the connecting ground layer 115 may include substantially the same material as that of the first electrode layer 110, and may be formed as a single unitary member with the first electrode layer 110.

Figure 7:
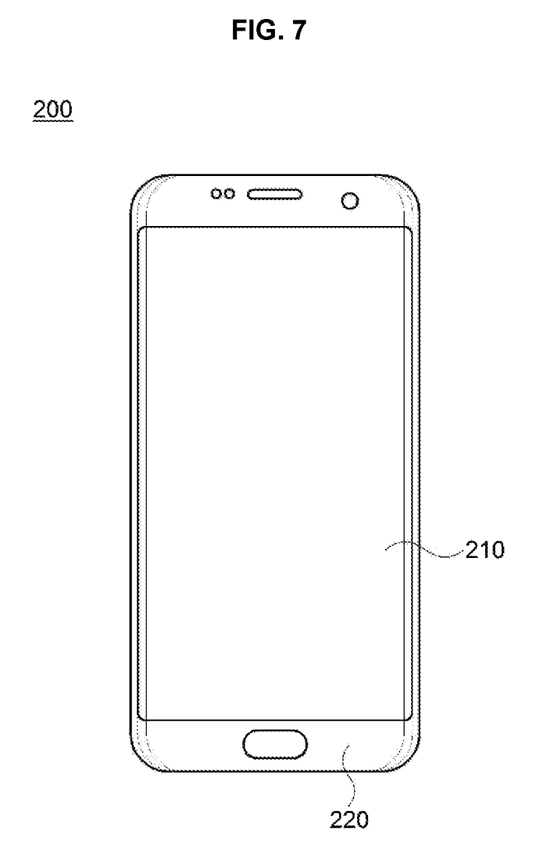
FIGS. 7 and 8 are schematic top planar views illustrating a display device in accordance with exemplary embodiments.
Figure 8:
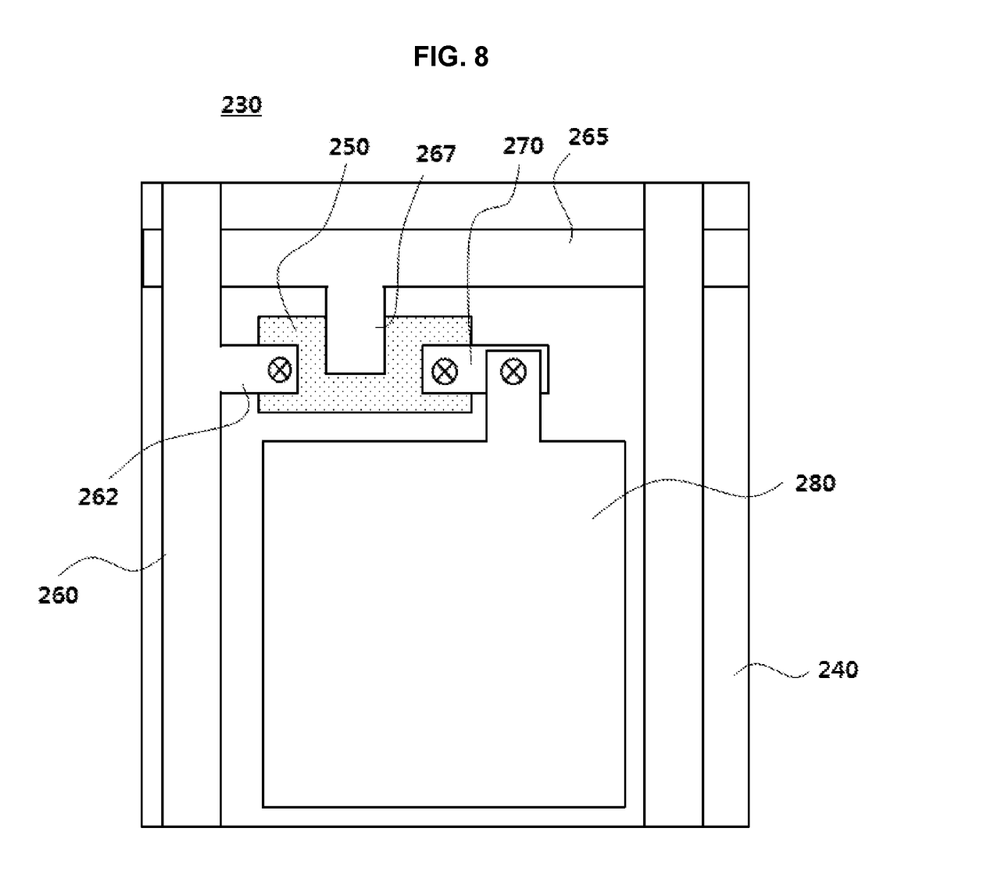

FIGS. 7 and 8 are schematic top planar views illustrating a display device in accordance with exemplary embodiments. For example, FIG. 7 illustrates an outer shape including a window of a display device. FIG. 8 is a schematic top planer view illustrating electrode structures included in a display panel.

Referring to FIG. 7, a display device 200 may include a display region 210 and a peripheral region 220.

In exemplary embodiments, the first region I and the second region II of the film antenna illustrated in FIG. 4 may correspond to the display region 210 and the peripheral region 220 of the display device 200, respectively. The peripheral region 220 may correspond to, e.g., a light-shielding portion or a bezel portion of the display device.

Thus, the antenna array electrode 132 of the film antenna may be disposed on the display region 210 to implement high transmittance, and the pad electrode 136 of the film antenna may be disposed on the peripheral region 220 so that low resistance and high signal transmission efficiency may be provided.

Referring to FIG. 8, a display panel 230 such as an LCD panel or an OLED panel may be disposed below the window of the display device. The display panel 230 may include a display substrate 240, a pixel structure including a thin film transistor (TFT), a wiring structure and an electrode structure. Various wiring structures such as the TFT including an active layer 250, a scan line 265, a data line 260, etc., and the electrode structures such as a source electrode 262, a gate electrode 267, a drain electrode 270 and a pixel electrode 280 included in the display panel 230 may be provided as the first electrode layer 110 that may serve as a ground layer of the film antenna.

In an embodiment, the display device 200 may be a flexible display having a flexibility. When the second electrode layer 130 is formed as a thin-layered metal electrode, the film antenna according to exemplary embodiments may be effectively applied to the flexible display.

Figure 9:
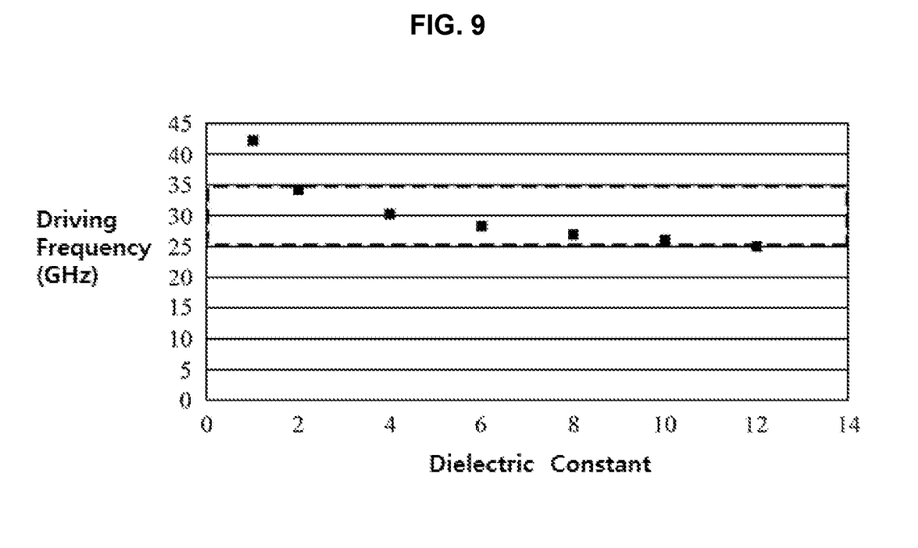
FIG. 9 is a graph showing an operating frequency depending on a change in a dielectric constant of a dielectric layer.
Figure 10:
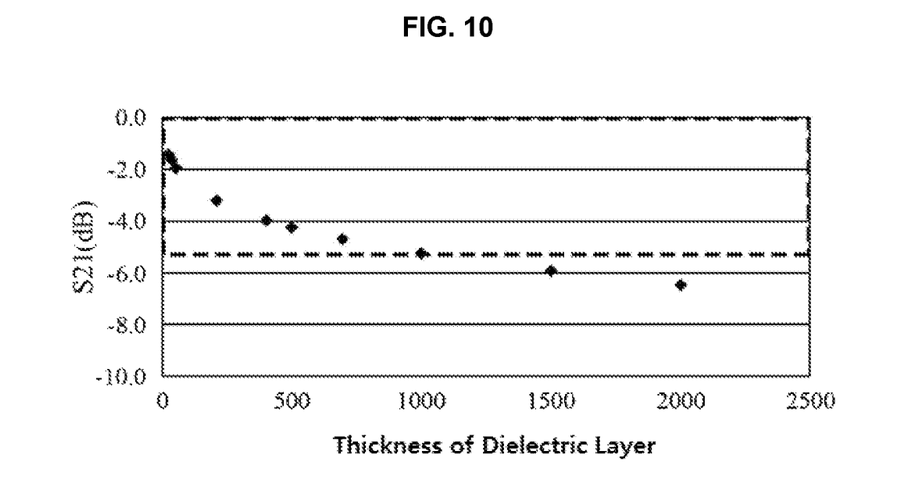
FIG. 10 is a graph showing a signal transmission coefficient (S21) of a transmission line depending on a change in a thickness of a dielectric layer.

FIG. 9 is a graph showing an operating frequency depending on a change in a dielectric constant of a dielectric layer. FIG. 10 is a graph showing a signal transmission coefficient (S21) of a transmission line depending on a change in a thickness of a dielectric layer.

Specifically, FIGS. 9 and 10 are graphs measuring driving frequency and signal transmission coefficient properties while changing a dielectric constant or a thickness of a dielectric layer including PET and/or OCA formed between a first electrode layer and a second electrode layer each having a thickness of 2,000 Å.

Referring to FIG. 9, a target signal loss (S11) level for a reception of high frequency and sensitivity was set as about −10 dB, a driving frequency according to a dielectric constant was measured. When the dielectric constant of the dielectric layer was within 2 to 10, high frequency driving/reception in a high frequency band from about 25 GHz to about 35 GHz was implemented while satisfying the target signal loss level. Specific measured values shown in FIG. 9 are listed in Table 1 below.

TABLE 1

| Dielectric Constant | Driving Frequency |
| --- | --- |
| 1 | 42.22 |
| 2 | 34.02 |
| 4 | 30.42 |
| 6 | 28.29 |
| 8 | 26.99 |
| 10 | 26.08 |
| 12 | 24.90 |

Referring to FIG. 10, a signal transmission coefficient (S21) level for a signal transmission in the high frequency band was set as about −5 dB, and properties according to a thickness of the dielectric layer were measured. When the thickness was about 1000 μm or less, the transmission line satisfying the target signal transmission coefficient property was is implemented. Specific measured values shown in FIG. 10 are listed in Table 2 below.

TABLE 2

| Thickness (μm) | S21 (dB) |
|---|---|
| 13 | −1.42 |
| 23 | −1.68 |
| 40 | −1.99 |
| 200 | −3.24 |
| 400 | −3.99 |
| 500 | −4.27 |
| 700 | −4.73 |
| 1000 | −5.27 |
| 1500 | −5.96 |
| 2000 | −6.50 |

What is claimed is:

1. A film antenna, comprising:
a first electrode layer;
a dielectric layer on the first electrode layer, the dielectric layer having a thickness in a range from 50 μm to 1,000 μm and having a dielectric constant in a range from 2 to 10; and
a second electrode layer on the dielectric layer,
wherein the second electrode layer includes an antenna array electrode and a transmission line connected to the antenna array electrode, and the antenna array electrode and the transmission line are disposed at the same level on a top surface of the dielectric layer; and
the dielectric layer is disposed between the first electrode layer and the second electrode layer.

2. The film antenna according to claim 1, wherein the first electrode layer includes a ground layer.

3. The film antenna according to claim 1, wherein the dielectric layer has a multi-layered structure.

4. The film antenna according to claim 3, wherein the dielectric layer includes an adhesive layer and a substrate layer sequentially stacked from the first electrode layer.

5. The film antenna according to claim 4, wherein the substrate layer includes at least one selected from the group consisting of glass, cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), polymethylmethacrylate (PMMA), and a combination thereof.

6. The film antenna according to claim 4, wherein the adhesive layer includes at least one of an optical clean adhesive (OCA) material and a pressure sensitive adhesive (PSA) material.

7. The film antenna according to claim 1, wherein the second electrode layer includes a mesh-pattern structure.

8. The film antenna according to claim 7, wherein the second electrode layer further includes a dummy mesh layer.

9. The film antenna according to claim 1, wherein the second electrode layer further includes a pad electrode.

10. The film antenna according to claim 9, wherein the antenna array electrode and the pad electrode are disposed at different layers or at different levels.

11. The film antenna according to claim 10, further comprising a via structure electrically connecting the antenna array electrode and the pad electrode to each other.

12. The film antenna according to claim 10, further comprising a connecting ground layer electrically connecting the pad electrode and the first electrode layer to each other.

13. The film antenna according to claim 12, wherein the connecting ground layer surrounds one sidewall of the dielectric layer to be connected to sidewalls of the pad electrode and the first electrode layer.

14. The film antenna according to claim 1, wherein a driving frequency of the film antenna is in a range from 25 GHz to 35 GHz.

15. A display device comprising the film antenna of claim 1.

16. The display device according to claim 15, comprising a display panel that includes a panel substrate, a pixel structure, a wiring structure and an electrode structure; and
the wiring structure or the electrode structure of the display panel serves as the first electrode layer of the film antenna.

* * * * *